（12） United States Patent
Crane

(10) Patent No.: US 7,993,078 B2
(45) Date of Patent: Aug. 9, 2011

(54) METHOD AND APPARATUS FOR INSTALLING AN UNDERGROUND PIPE

(75) Inventor: Robert F. Crane, Oconomowoc, WI (US)

(73) Assignee: Harr Technologies, LLC, Kasilof, AK (US)

( * ) Notice: Subject to any disclaimer, the term of this patent is extended or adjusted under 35 U.S.C. 154(b) by 400 days.

(21) Appl. No.: 11/703,937

(22) Filed: Feb. 8, 2007

(65) Prior Publication Data
US 2008/0193220 A1    Aug. 14, 2008

(51) Int. Cl.
*F16L 1/028*    (2006.01)
(52) U.S. Cl. .................................................. 405/184.1
(58) Field of Classification Search .............. 405/184, 405/174, 184.1, 184.2, 184.4, 184.5, 183.5, 405/184.3; 299/16, 17; 166/242.8; 175/402
See application file for complete search history.

(56) References Cited

U.S. PATENT DOCUMENTS

| 2,325,565 | A | * | 7/1943 | Williams | 405/184 |
| 4,124,082 | A | * | 11/1978 | Garver | 175/62 |
| 4,329,077 | A | | 5/1982 | Bouplon | 403/287 |
| 5,639,183 | A | * | 6/1997 | Griffioen et al. | 405/183.5 |
| 6,206,345 | B1 | | 3/2001 | Lenahan et al. | 254/29 |
| 2002/0061231 | A1 | * | 5/2002 | Finzel et al. | 405/154.1 |
| 2005/0097689 | A1 | | 5/2005 | Harr | 15/104.16 |

FOREIGN PATENT DOCUMENTS

JP    01219293 A    *    9/1989
JP    03176596 A    *    7/1991

OTHER PUBLICATIONS

"Guidelines for Pipe Ramming, TTC Technical Report #2001.04" Jadranka Simicevic and Raymond L. Sterling, Dec. 2001, 36 pages.

* cited by examiner

*Primary Examiner* — Sunil Singh
(74) *Attorney, Agent, or Firm* — Dorsey & Whitney LLP

(57) ABSTRACT

A method of installing an underground pipe includes a step of placing a leading end of a pipe section at an entry point for the underground pipe. An arcuate soil shoe is attached to an inside surface of the pipe section at or near the leading end of the pipe section, which soil shoe has a passageway therein with one or more outlets. A conduit is positioned to feed a lubricating liquid into the passageway, which liquid passes through the outlets to enter the inside of the pipe section. A driver such as a pneumatic impact tool is placed at a trailing end of the pipe section and used to drive the pipe section into the earth. A lubricating liquid is supplied through the conduit, which liquid passes into the passageway and through the outlets into the inside of the pipe section.

14 Claims, 4 Drawing Sheets

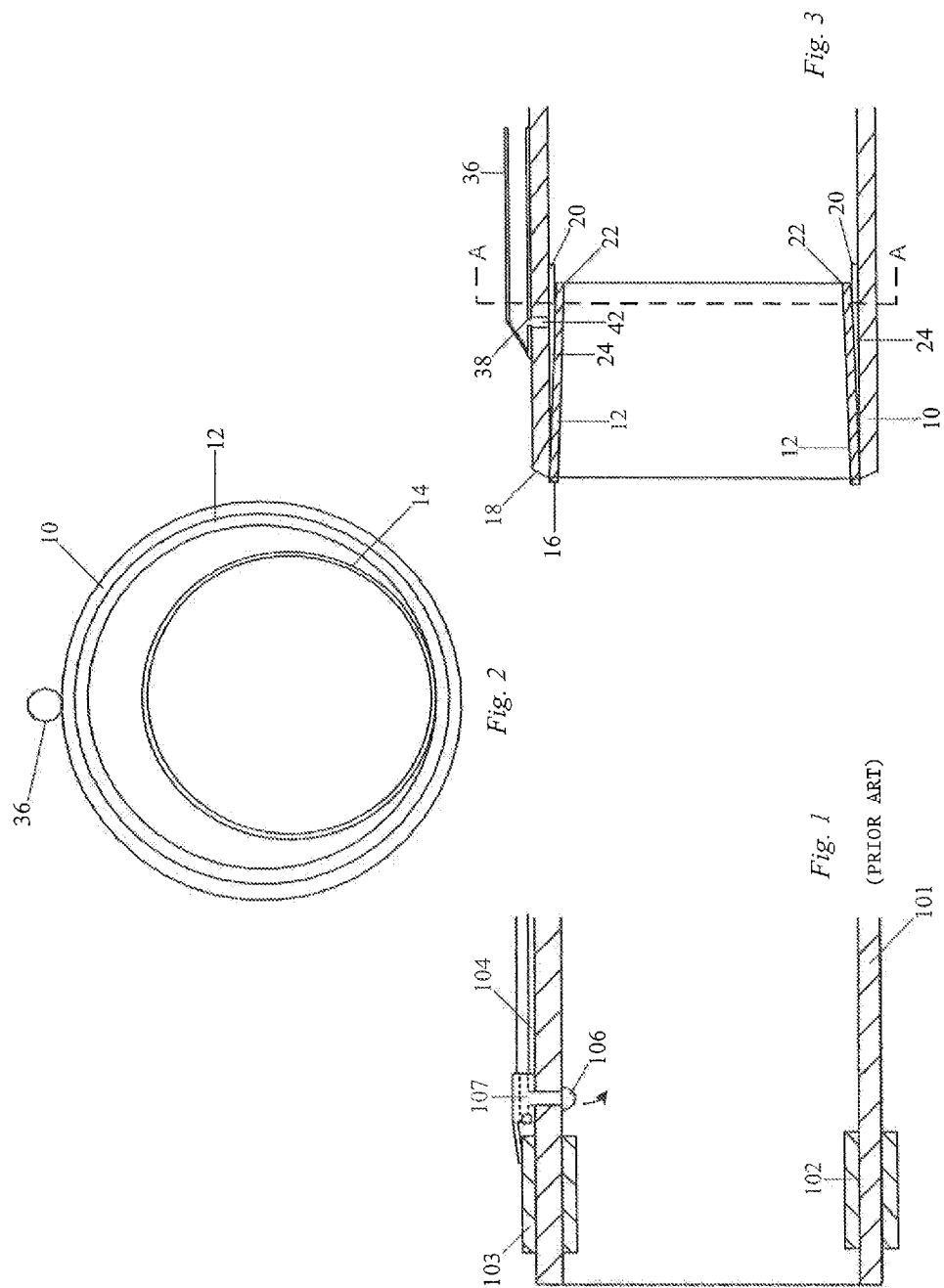

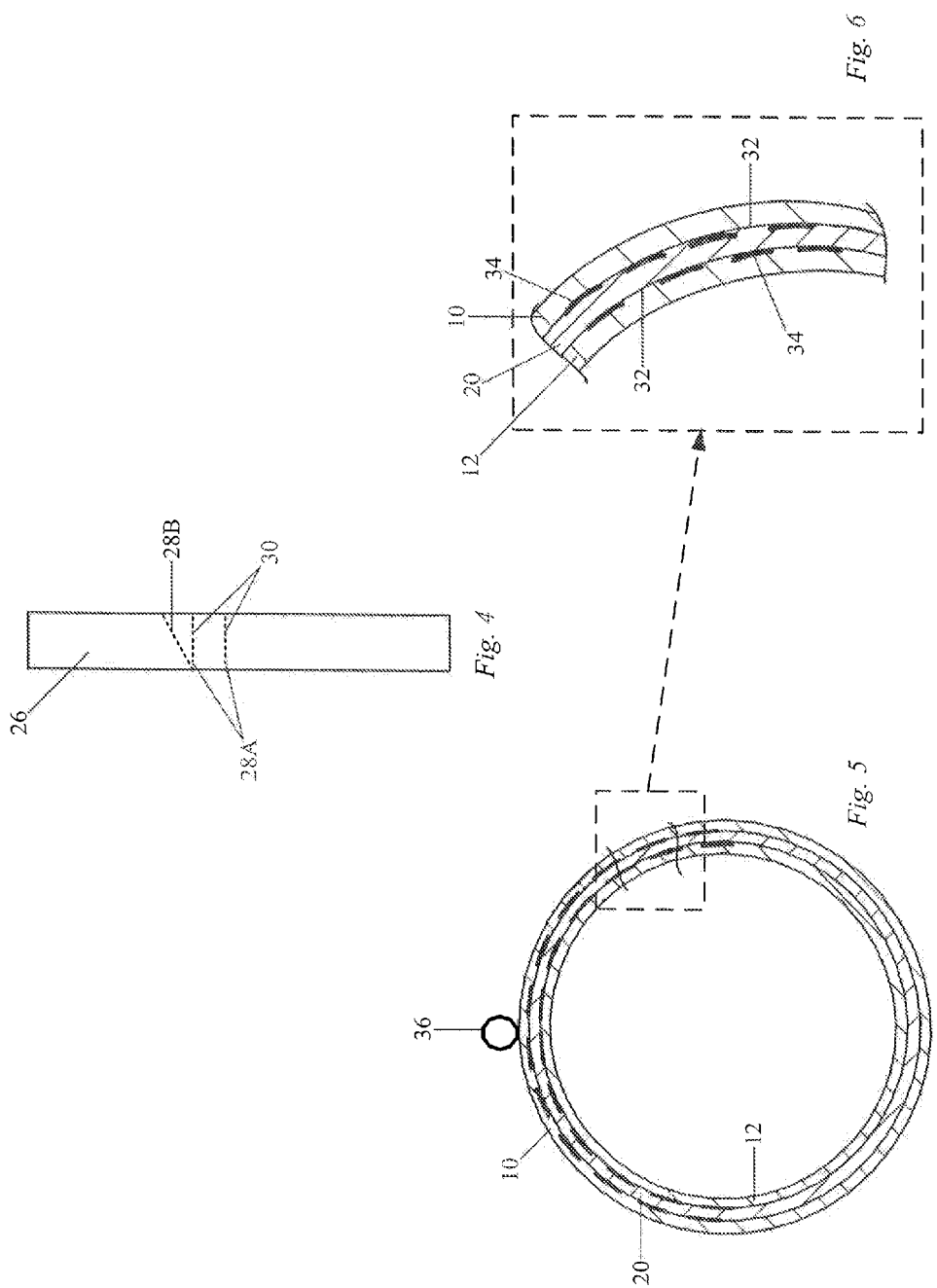

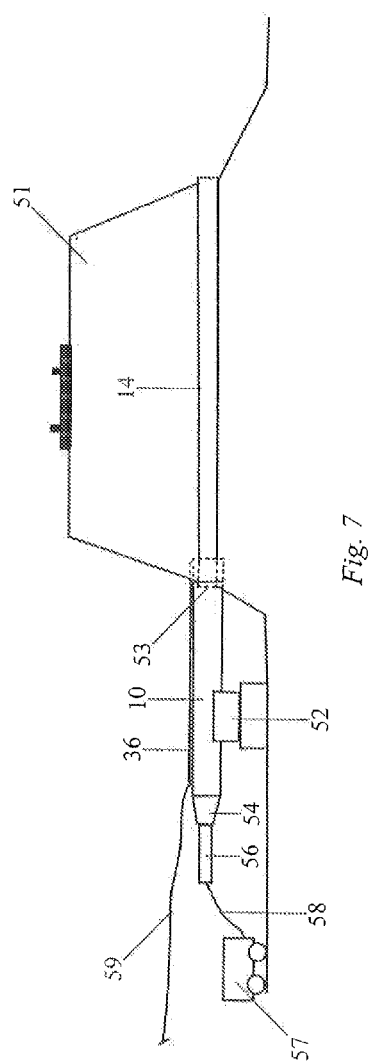

METHOD AND APPARATUS FOR INSTALLING AN UNDERGROUND PIPE

TECHNICAL FIELD

The invention relates installing underground pipes, and, in particular to a method and apparatus for replacement of existing pipes and culverts using pipe ramming techniques.

BACKGROUND OF THE INVENTION

Pipe ramming is a well-known method of installing or replacing underground pipes in which an impact tool is used to push a pipe through the earth. A pneumatic impact tool is attached to a first pipe section and used to drive the pipe section into and through the earth. The impact tool engages the pipe section by means of an adapter such as a cone or a set of collets. See Bouplon U.S. Pat. No. 4,329,077, May 11, 1982. After the first pipe section has been driven into the earth, the impact tool is disconnected from the pipe section and a second pipe section is welded or otherwise attached to the trailing end of the first pipe section. The impact tool is then connected to the second pipe section to continue the ramming operation. Additional pipe sections are added and rammed into the earth until the leading end of the pipe reaches the desired endpoint.

In the case of small pipes, i.e., less than 6 inches, the leading end of the rammed pipe is typically closed, with a conical fitting or cap. Larger diameter pipes are rammed with the leading end of the pipe open. Spoil trapped inside the pipe is removed periodically as the pipe advances or, for shorter runs, after the entire length of pipe has been installed. The spoil may be removed from the rammed pipe with an auger, pressurized air or high pressure water. Pipe ramming is particularly suited for installing or replacing pipe under and through structures such as roadbeds for rail road tracks and highways where other methods, such as horizontal drilling, could cause settlement and/or collapse of overlying structures. Hydraulic systems have also been used for pipe pushing; see for example Lenahan U.S. Pat. No. 6,206,345, Mar. 27, 2001.

Referring to FIG. 1, when ramming an open-ended pipe 101, a cylindrical soil shoe 102 may be installed on the inside surface of the leading end of the pipe. The purpose of soil shoe 102 is to compact the spoil entering pipe 101 and create a small clearance between the spoil and the inside surface of the pipe as the pipe is rammed through the earth. The small clearance created between pipe 101 and the spoil reduces friction between the inside surface of the pipe and the spoil, facilitating the ramming process. An external soil shoe 103 may be placed on the outside surface of pipe 101 for essentially the same purpose. Water is introduced into the pipe in order to soften the debris inside, turning it to mud. A water line 104 extends along the outside of the lead pipe section to a radial hole 106 through both the pipe wall behind soil shoe 102. Hole 106 is spaced from the rear edge of soil shoe 102. Water line 104 is made from a series of 0.5" steel pipes joined by a series of 0.5" steel couplers, the forwardmost coupler 107 is a T-fitting having a side hole therein that communicates with hole 106 and its front end closed by a threaded plug. This arrangement has been used in pipe ramming generally but not, as far as the present inventor is aware, in connection with culvert swallowing operations wherein the pipe is pushed in around an existing pipeline or culvert of smaller diameter.

In another known method, during ramming of a large diameter pipe, resistance is encountered and it become difficult or impossible to complete the run. In some cases, a smaller pipe has been rammed through the inside of the larger one and used to continue the pipe ramming operation, creating telescoping pipe sections. Such a method involves placing a smaller pipe inside of a larger one, but the large pipe is not replacing the smaller one.

While the prior art soil shoe of FIG. 1 may, to some degree, reduce friction between pipe 101 and spoil captured in the pipe during the ramming operation, further reduction of such friction is desirable, as are improved techniques for removing spoil from inside a pipe after it has been rammed into the earth. This is especially the case where an existing pipe or culvert is to be replaced by ramming a larger diameter pipe into the earth around the existing pipe. When an existing pipe is "swallowed" by a larger diameter replacement pipe rammed into place around it, spoil compacted between the replacement and existing pipe hinders removal of the existing pipe. Removal of the trapped spoil using conventional techniques such as auguring or water blasting may also be blocked or hindered by the existing pipe. The present invention provides an improved method of pipe ramming that addresses these difficulties.

SUMMARY OF THE INVENTION

A method of installing an underground pipe according to the invention first involves placing a leading end of a pipe section at an entry point for the underground pipe with an arcuate soil shoe attached to an inside surface of the pipe section at the leading end of the pipe section. The soil shoe has a passageway therein with one or more outlets, and a conduit is positioned to feed a lubricating liquid into the passageway, which liquid passes through the outlets to enter the inside of the pipe section. A driver such as an impact tool or hydraulic jack is positioned at a trailing end of the pipe section and operated to drive the pipe section into the earth. A lubricating liquid is supplied through the conduit, which liquid passes into the passageway and out the outlets into the inside of the pipe section. The liquid serves to loosen spoil that enters the leading end of the pipe section.

In a preferred form of the invention, the soil shoe extends rearwardly and radially inwardly at an angle from the leading end of the pipe section to thereby form the passageway between the inside of the pipe section and the soil shoe. The conduit conducts the liquid along the outside of the pipe section to a radial hole through the pipe section which communicates with the passageway, and the outlets direct the liquid rearwardly into the pipe section.

The method of the invention can be used to "swallow" an existing pipeline or culvert, aiding in its removal. Such a method of replacing an underground pipe involves positioning the leading end of a pipe section over an end of the underground pipe such that the end of the underground pipe is inside the pipe section, forcing the pipe section into the earth around the existing pipe, and lubricating the inside surface of the pipe section with a liquid supplied to a space between the inside surface of the pipe section the outside surface of the existing pipe. The pipe section is driven in around the existing pipeline of smaller diameter, and the existing pipeline is normally removed from inside the pipe section after the pipe section has been driven into the ground. The existing pipeline is typically positioned inside the pipe section with its lengthwise axis downwardly offset from the lengthwise axis of the pipe section, and the outlets for the liquid are ranged over an arc above the existing pipeline.

The invention further provides an apparatus for installing an underground pipe according to the foregoing methods. Such an apparatus includes a pipe section having a leading end and a radial hole extending therethrough near the leading end. An arcuate soil shoe is attached to the inside surface of the pipe section proximate the leading end of the pipe section, which soil shoe extends radially inwardly and rearwardly over the radial hole from the leading end of the pipe section to thereby form a passageway therein between the inside of the pipe section and the soil shoe, which passage has one or more rearwardly directed outlets. A conduit extends along the outside of the pipe section positioned to feed a lubricating liquid into the passageway through the radial hole, which liquid passes through the outlets to enter the inside of the pipe section. The soil shoe is generally arcuate in shape and preferably extends over at least 90 degrees along the inner circumference of the pipe section.

A spacer may be attached to the inside surface of the pipe section for spacing an inner end of the soil shoe from the inside surface of the pipe section to form the passageway. The spacer can be skip- or stitch-welded to the inside of the pipe section such that lubricating liquid can flow from the passageway through holes or gaps between the welds which form the outlets. Similarly, the soil shoe may be skip-welded to the spacer to provide additional gaps. These and other aspects of the invention are discussed further in the detailed description that follows.

BRIEF DESCRIPTION OF THE DRAWINGS

The invention will hereafter be described with reference to the accompanying drawings, wherein like numerals denote like elements, and wherein:

FIG. 1 is a lengthwise sectional view of a pipe section including a prior art soil shoe attached to the leading end of the pipe section;

FIG. 2 is a front view of a pipe section with a soil shoe according to the invention wherein the replacement pipe is positioned around an existing smaller diameter pipe to be replaced;

FIG. 3 is a lengthwise sectional view of a pipe section having a soil shoe and spacer according to the invention;

FIG. 4 is a side view of a piece of pipe with a section removed to form the spacer of FIG. 3;

FIG. 5 is a cross section taken along line A-A of FIG. 3;

FIG. 6 is a front view the replacement pipe of FIG. 4;

FIG. 7 is a schematic representation of an apparatus and method according to the invention for replacement of a culvert through a rail road track road bed. References to "diameter" herein refer to outer diameter (OD) unless otherwise noted;

DETAILED DESCRIPTION

Figure 9:
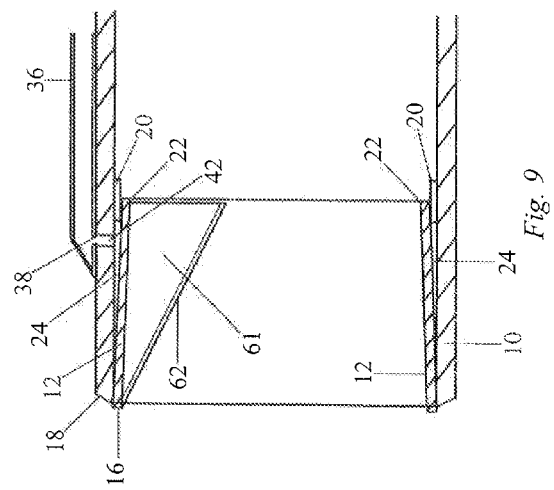
FIG. 9 is a lengthwise sectional view of the apparatus of FIG. 8.

Referring to FIGS. 2-5 according to the invention, a pipe section 10 is provided with a soil shoe 12 in preparation for ramming the pipe into the earth around an existing pipe or culvert 14. Soil shoe 12 extends rearwardly into pipe section 10 from a leading end 16 that is welded or otherwise fastened to the leading end 18 of the pipe section. A spacer 20 positioned between the trailing end 22 of soil shoe 12 and the inside surface of the pipe section holds the trailing end of the shoe away from the inside surface of the pipe. Spacer 20 and soil shoe 12 extend around the inside perimeter of pipe section 10, creating a forwardly tapering, annular or arc-shaped passageway 24 between the soil shoe 12 and the pipe section 10. Passageway 24 allows for distribution of a lubricating liquid such as water, a mixture of water and a clay and/or a polymer drilling fluid around the inside perimeter of pipe section 10.

The lubricating liquid is supplied through a pipe or conduit 36 fastened to the outside of pipe section 10. Holes 38, 42 in pipe 36 and pipe section 10, respectively, allow the lubricating liquid to flow from the pipe into passageway 24. Pipe 36 is a galvanized steel pipe up to 2" in diameter, typically ½" to 1" OD, that is welded to pipe section 10 with the leading end of the pipe capped or hammered closed and welded shut. The water line is small relative to the pipe section, generally no more than 10% of its diameter. Holes 38, 42 are located in front of the rear edge of shoe 12, rather than behind it as in FIG. 1, so that the liquid deflects off of the outside of shoe 12 which acts as a baffle and is directed rearwardly, rather than spraying in a radial direction as in FIG. 1.

Spacer 20 may be formed from a piece 26 of pipe cut from the end of pipe section 10. As shown in FIG. 4, a rectangular section 28A is cut from the perimeter of piece 26 such that ends 30 of the piece can be forced together to reduce its diameter, allowing it to be fitted into and welded to pipe section 10. Soil shoe 12 may be formed in the same manner from a longer piece of pipe using a section 28B narrower at one end than the other to provide the taper of the shoe 12.

To allow lubricating liquid to flow from passageway 24 into pipe section 10, spacer 20 is skip or stitch-welded over at least an upper portion of pipe section 10 as illustrated in FIGS. 5 and 6. Water or drilling liquid flows from passageway 24 through gaps 32 between welds 34, lubricating the inside surface of pipe section 10. The trailing end 22 of soil shoe 12 may be likewise skip welded to spacer 20 to provide additional openings 32 through which the drilling liquid may flow. Typically, spacer 20 and/or shoe 12 are skip welded over a 180° arc extending from about 3:00 o'clock (90°) to about 9:00 o'clock (270°) where lubrication between pipe section 10 and spoil trapped between the pipe section and existing pipe 14 is most needed. Soil between the existing conduit 14 and the new pipe section 10 will be in this area, which is crescent shaped as shown in FIG. 2.

Pumping a drilling or lubricating liquid through passageway 24 into pipe section 10 lubricates the inner surface of the pipe section 10 reducing friction between the inside surface of the pipe section and spoil trapped in the section. The drilling liquid also tends to loosen and wash away spoil that would otherwise be compacted as pipe section 10 is rammed into the earth. Loosening and washing away spoil in this manner is particularly advantageous when replacing an existing pipe 14 by ramming a larger diameter pipe into place around the existing pipe. Loosening and washing the spoil in this manner reduces the amount of force required to remove existing pipe 14 after the ramming operation has been completed as well as the amount of force required to ram pipe section 10 through the earth.

Although as illustrated, soil shoe 12 and spacer 20 extend substantially around the inside perimeter of pipe section 10, it is contemplated that shoe 12 and/or spacer 12 may extend around less than the entire inside perimeter of the inside of the pipe section. Thus, soil shoe 12 and spacer 20 could be fabricated in arc shaped segments and welded to the inside perimeter of pipe section 10 with the ends of the segments either spaced apart or abutted. In another variation, lengthwise holes or grooves may be formed in soil shoe 12 and/or spacer 20 to allow lubricating liquid to flow from passageway 24 rearwardly along the inside of pipe section 10, allowing continuous welds between the inside surface of the pipe section, the spacer and/or the soil shoe.

Figure 8:
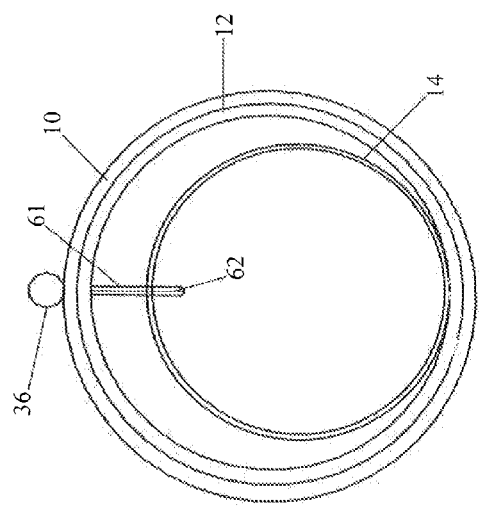
FIG. 8 is the same view as FIG. 2, with an optional pipe splitting blade.

Optionally, as shown in FIGS. 8 and 9, a blade 61 may be mounted on the inside of soil shoe 12 so that it extends radially inwardly. During ramming, the angled edge 62 of blade 61 cuts into inner pipe or culvert 14 at its top and splits it, aiding in its later removal. Blade 61 could be made of any convenient shape and could be attached elsewhere, e.g. to the inside of the pipe section 10 behind soil shoe 12.

Referring to FIG. 7, to replace a culvert 14 extending under and through a railroad bed 51, a leading pipe section 10 is fabricated with a soil shoe, spacer and liquid conduit as described in connection with FIG. 3. A pipe cradle or guide 52 is positioned adjacent one end 53 of culvert 14, and pipe section 10 is placed in guide 52 with its leading end positioned over end 53. Since the ends of culvert 14 are exposed, there is no need excavate entrance and exit pits. Where one or both ends of the pipe or pipe section to be replaced are buried, an entry and/or exit pit is excavated and a section of the existing pipe is removed to provide room for a replacement pipe section and impact tool in the pit.

A cone shaped adaptor 54 of a type well known in the art is inserted into the trailing end of pipe section 10 to connect a driver such as a pneumatic impact tool 56 to the larger diameter pipe section 10. An air compressor 57 supplies air to impact tool 56 via a hose 58, and pressurized drilling liquid (e.g., water) is supplied through a second hose 59 to small diameter pipe 36. Tool 56 is turned on to deliver cyclic impacts to adaptor 54 to thereby ram pipe section 10 into the earth around culvert 14. As pipe section 10 is driven through the earth, pressurized drilling liquid is supplied to the pipe section 10 as described above. The spoil mixed with drilling liquid flows back out through openings provided in adapter 54.

After the first pipe section 10 is fully driven into the earth, adaptor 54 and hose 59 are removed, and a second pipe section is butt welded to the trailing end of first pipe section 10. Adaptor 54 and impact tool 56 are then mounted on the trailing end of the second pipe section, and the second pipe section is driven into the earth, pushing the first pipe section 10 further ahead. The second pipe section is identical to the first except that it lacks the shoes and related structures at its front end. The second pipe section has a second section of pipe 36 welded to it, and this section is coupled with the original pipe 36 to extend the liquid supply line. Hose 59 is then reattached to the free end of the second pipe 36. In the alternative, if hose 59 is sufficiently durable, it can be allowed to trail behind the leading pipe section.

This process is repeated until leading end of pipe section 10 extends through rail road bed 51, after which adaptor 54 and impact tool 56 are disconnected from the replacement pipe. Culvert 14, which is entirely inside of the series of pipe sections 10, is then removed by pulling the it out of one end of the new pipeline with a winch, jack or a piece of mobile machinery. In this manner an existing culvert that may be damaged or undersized can be readily replaced with one of greater capacity.

It will be understood that the foregoing description is of preferred exemplary embodiments of the invention, and that the invention is not limited to the specific forms described and illustrated. For example, the soil-shoe may be cylindrical and have L-shaped passageways drilled therein which communicate with an arcuate manifold groove that receives liquid from the radial hole in the pipe section wall. This and other modifications may be made in without departing from the scope of the invention as expressed in the appended claims.

The invention claimed is:

1. A method of installing an underground pipe, comprising the steps of:

placing a leading end of a pipe section at an entry point for the underground pipe, the pipe section having an arcuate soil shoe attached to an inside surface thereof the at leading end of the pipe section, which soil shoe and pipe section form a passageway between the inside surface of the pipe section and an outside surface of the soil shoe with one or more liquid outlets, and a conduit is positioned to feed a lubricating liquid into the passageway to come into contact with the inside surface of the pipe section and the outside surface of the soil shoe, which liquid passes through the one or more liquid outlets to enter the inside of the pipe section;

positioning a driver at a trailing end of the pipe section;

driving the pipe section into the earth; and supplying a lubricating liquid through the conduit, which liquid passes into the passageway and out the one or more liquid outlets into the inside of the pipe section.

2. The method of claim 1, wherein the soil shoe extends rearwardly and radially inwardly at an angle from the leading end of the pipe section to thereby form the passageway between the inside of the pipe section and the soil shoe.

3. The method of claim 1, wherein the conduit conducts the liquid along the outside of the pipe section to a radial hole through the pipe section which communicates with the passageway, and the one or more liquid outlets direct the liquid rearwardly into the pipe section.

4. The method of claim 3, wherein the step of driving the pipe section into the earth further comprises ramming the pipe section into the earth with an impact tool.

5. The method of claim 1, further comprising, after the pipe section has been driven into the ground:

welding a front end of a second pipe section to the trailing end of the one driven into the ground;

repositioning the driver at the trailing end of the second pipe section;

driving the welded pipe sections into the earth; and repeating the preceding welding, repositioning and driving steps for third and subsequent pipe sections to form a new pipeline comprising a series of the pipe sections welded end to end.

6. The method of claim 5, wherein the conduit comprises a metal pipe smaller than the pipe section which metal pipe is secured to the outside of the pipe section, further comprising securing additional lengths of the metal pipe to a trailing end of the conduit to extend the conduit as additional pipe sections are driven into the ground.

7. The method of claim 1, further comprising:

driving the pipe section in around an existing pipeline of smaller diameter; and removing the existing pipeline from inside the pipe section after the pipe section has been driven into the ground.

8. The method of claim 7, wherein the existing pipeline is positioned inside the pipe section with its lengthwise axis downwardly offset from the lengthwise axis of the pipe section, and a plurality of the liquid outlets are ranged over an arc above the existing pipeline.

9. The method of claim 1 further comprising, before the placing step:

attaching a spacer to the inside surface of the pipe section at a location spaced from the leading end of the pipe section, the spacer extending around at least a portion of the inside perimeter of the pipe section;

attaching the soil shoe to the pipe section so that the soil shoe extends into the pipe with the spacer holding a rear end portion of the soil shoe away from the inside surface of the pipe section to form a space between the soil shoe and inside surface of the pipe section, which space tapers towards the leading end of the pipe section and forms the passageway, the soil shoe extending around at least a portion of the inner circumference of the pipe section; and attaching the conduit to the pipe section with the conduit in communication with the space between the soil shoe and the pipe section.

10. The method of claim 9, wherein the step of attaching a spacer to the inside surface of a pipe section further comprising skip welding the spacer to the inside of the pipe section such that lubricating liquid can flow through gaps between the welds, which gaps form the one or more liquid outlets.

11. A method of replacing an underground pipe comprising:

positioning the leading end of a pipe section over an end of the underground pipe such that the end of the underground pipe is inside the pipe section, the pipe section having a soil shoe attached proximate to the leading end of the pipe section;

forcing the pipe section into the earth around an existing pipe; and lubricating the inside surface of the pipe section with a liquid supplied to a space formed by the inside surface of the pipe section and the outside surface of the soil shoe and then removing the underground pipe.

12. An apparatus for installing an underground pipe comprising;

a pipe section having a leading end and a radial hole extending therethrough near the leading end;

an arcuate soil shoe attached to the inside surface of the pipe section proximate the leading end of the pipe section, which soil shoe extends radially inwardly and rearwardly over the radial hole from the leading end of the pipe section to thereby form a passageway defined by the inside surface of the pipe section and a surface of the soil shoe and the passageway configured to at least partially contain liquid provided thereinto against the inside surface of the pipe section and the surface of the soil shoe, which passageway has one or more rearwardly directed liquid outlets; and a conduit extending along the outside of the pipe section positioned to feed a lubricating liquid into the passageway through the radial hole, which liquid passes through the one or more outlets to enter the inside of the pipe section.

13. The apparatus of claim 12, wherein the soil shoe is generally arcuate in shape and extends over at least 90 degrees along the inner circumference of the pipe section.

14. The apparatus of claim 13, further comprising a spacer attached to the inside surface of the pipe section for spacing an inner end of the soil shoe from the inside surface of the pipe section to form the passageway.

* * * * *